United States Patent
Hofmann

(10) Patent No.: US 9,770,748 B2
(45) Date of Patent: Sep. 26, 2017

(54) APPARATUS AND METHOD FOR SAMPLING THICK STRIPS

(75) Inventor: Karl Robert Hofmann, Netphen (DE)

(73) Assignee: SMS LOGISTIKSYSTEME GMBH, Netphen (DE)

( * ) Notice: Subject to any disclaimer, the term of this patent is extended or adjusted under 35 U.S.C. 154(b) by 862 days.

(21) Appl. No.: 13/979,390

(22) PCT Filed: Mar. 23, 2012

(86) PCT No.: PCT/EP2012/001277
§ 371 (c)(1),
(2), (4) Date: Aug. 2, 2013

(87) PCT Pub. No.: WO2012/126631
PCT Pub. Date: Sep. 27, 2012

(65) Prior Publication Data
US 2016/0221057 A1    Aug. 4, 2016

(30) Foreign Application Priority Data

Mar. 23, 2011 (DE) .................. 10 2011 014 709
Jun. 8, 2011 (DE) .................. 10 2011 103 640

(51) Int. Cl.
*B21C 47/22* (2006.01)
*B21C 47/34* (2006.01)
(Continued)

(52) U.S. Cl.
CPC .......... *B21C 47/22* (2013.01); *B21C 47/3433* (2013.01); *B21C 51/00* (2013.01); *B23D 33/02* (2013.01)

(58) Field of Classification Search
CPC ......... B21C 47/16; B21C 47/18; B21C 47/22; B21C 47/34; B21C 47/3433; B23D 33/02
See application file for complete search history.

(56) References Cited

U.S. PATENT DOCUMENTS 2,246,840 A * 6/1941 Crane .................... B21C 47/34
242/564.5
2,965,328 A    12/1960 Groll
(Continued)

FOREIGN PATENT DOCUMENTS

DE    659080 B    4/1938
FR    1499337 B    9/1967
(Continued)

*Primary Examiner* — Debra Sullivan
(74) *Attorney, Agent, or Firm* — Andrew Wilford

(57) ABSTRACT

The invention relates to an apparatus for sampling rolled metal strips wound up into a coil (1), in particular in the thickness range of >12 mm, comprising a coil rotator and an apparatus (6) for separating the sample from the metal strip (4), characterized in that the coil rotator has at least two rotatable supports (2, 3), preferably trough rollers arranged in a lower quadrant of the coil (1) lying on the coil rotator, and also an outer guide (5) for the metal strip, the outer guide (5) extending angularly around the coil (1) by more than 180° in a region downstream of the downstream support (3) in an unwinding direction of the metal strip and is provided with means (7) for reducing friction of the metal strip on an inner surface of the outer guide (5). Furthermore, the invention relates to a method of sampling rolled metal strips wound up into a coil (1), in particular in the thickness range of >12 mm, with a coil rotator and an apparatus (6) for separating the sample from the metal strip, preferably by an apparatus according to the invention.

14 Claims, 5 Drawing Sheets

(51) Int. Cl.
*B21C 51/00* (2006.01)
*B23D 33/02* (2006.01)

(56) References Cited

U.S. PATENT DOCUMENTS

| | | | |
|---|---|---|---|
| 3,715,903 A * | 2/1973 | Huber | B21C 19/00 72/183 |
| 4,344,605 A | 8/1982 | Ganseuer | |
| 4,399,729 A | 8/1983 | Malinowski | |
| 5,107,084 A | 4/1992 | Ueno et al. | |
| 5,192,253 A | 3/1993 | Cole, Jr. et al. | |
| 8,096,158 B2 | 1/2012 | Moser | |
| 2001/0001376 A1 | 5/2001 | Kneppe et al. | |
| 2008/0190258 A1 | 8/2008 | Moser et al. | |
| 2012/0042705 A1 | 2/2012 | Curtis | |

FOREIGN PATENT DOCUMENTS

| | | |
|---|---|---|
| SU | 512870 A1 | 5/1976 |
| SU | 1014051 A | 4/1983 |

* cited by examiner

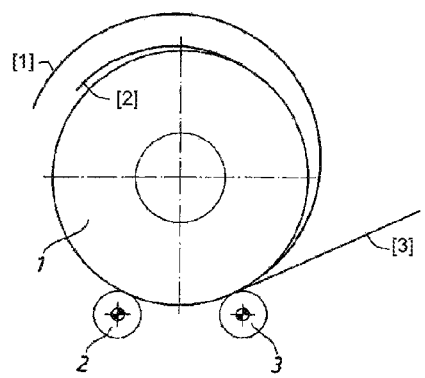
Fig.1 - Prior Art
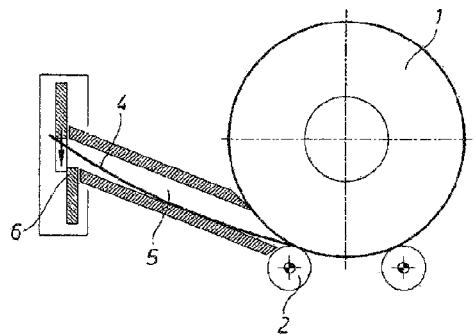
Fig.2 - Prior Art
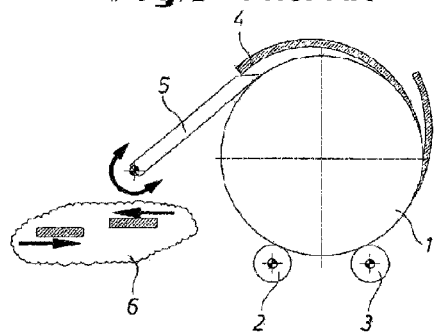
Fig.3 - Prior Art
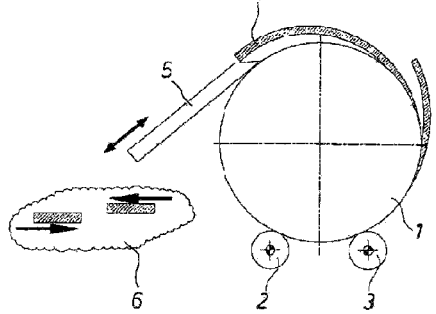
Fig.4 - Prior Art
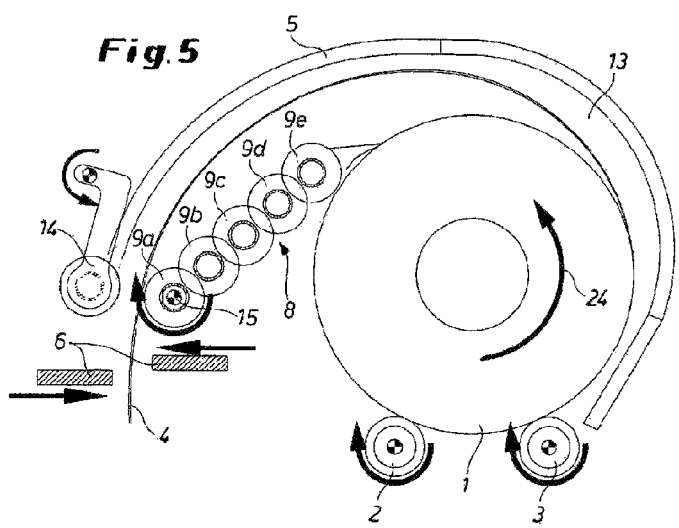
Fig.5
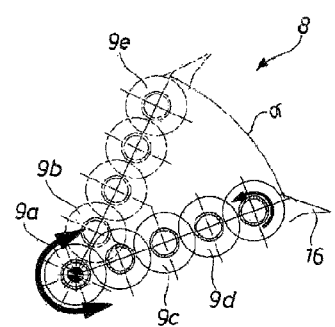
Fig.6

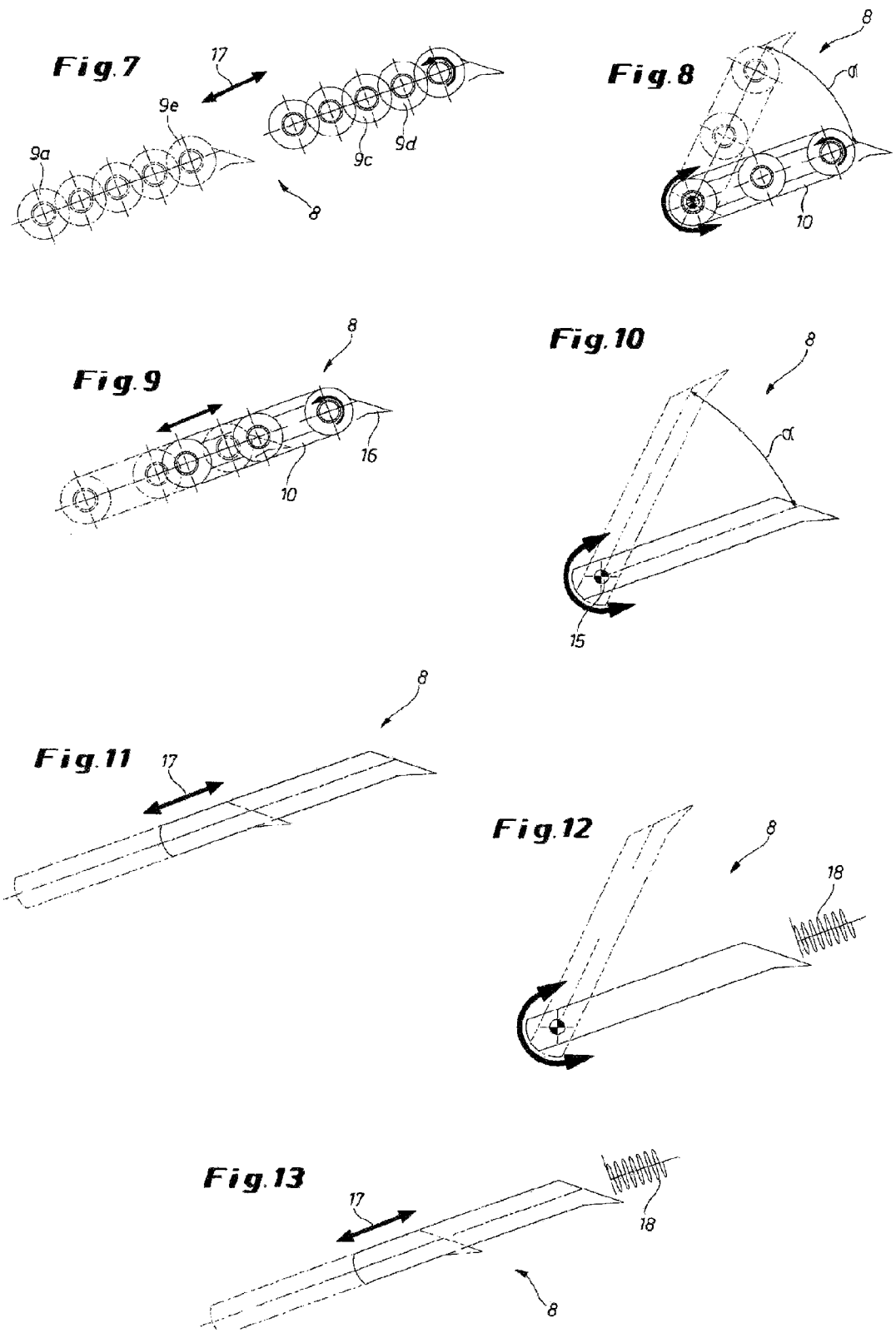

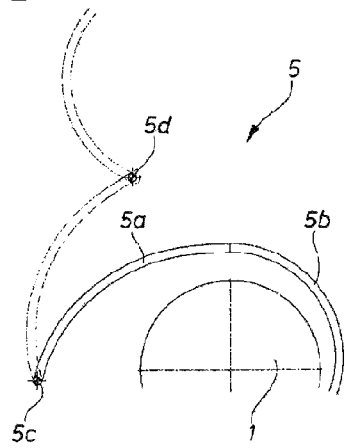
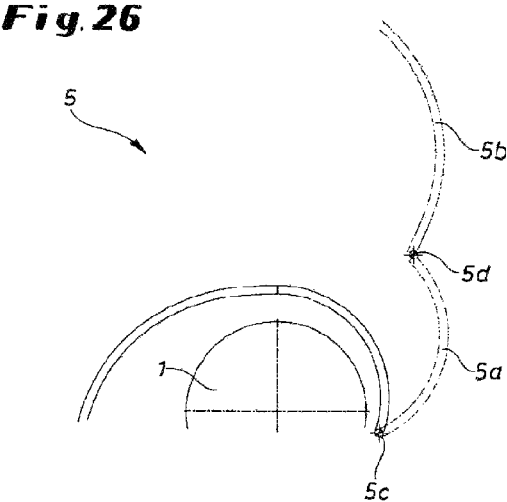
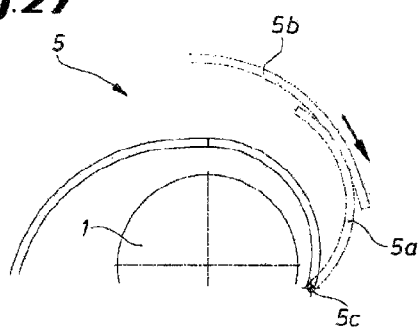
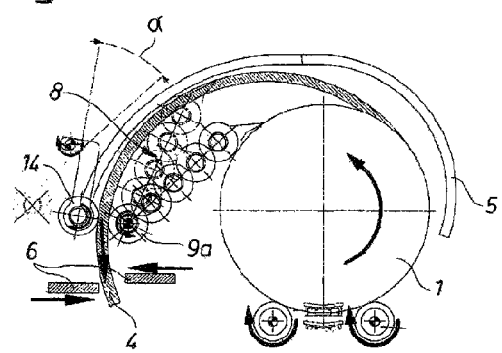
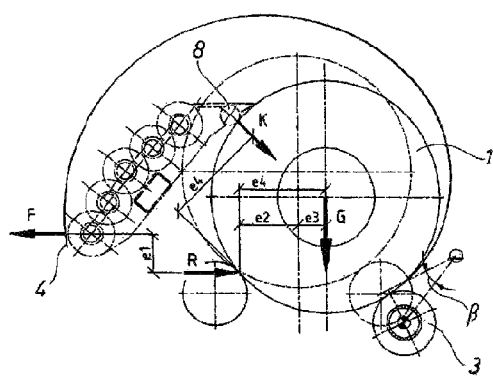

APPARATUS AND METHOD FOR SAMPLING THICK STRIPS

CROSS REFERENCE TO RELATED APPLICATIONS

This application is the US-national stage of PCT application PCT/EP2012/001277 filed 23 Mar. 2012 and claiming the priority of German patent application 102011014709.8 itself filed 23 Mar. 2011 and German patent application 102011103640.0 itself filed 8 Jun. 2011.

FIELD OF THE INVENTION

The invention relates to a method of and apparatus for sampling rolled metal strip wound up into a coil, in particular in the thickness range of >12 mm, with a coil rotator and an apparatus for separating the sample from the metal strip.

BACKGROUND OF THE INVENTION

Modern plate mills produce plates that, when wound up, are referred to as coils. In order to monitor the quality of the steel, samples are usually taken from the leading or the trailing end of the strip. Automated inspection systems and sampling stations are available for this purpose up to a medium thickness range of about 12 mm. Samples in the upper thickness range of >12 mm (up to about 25 mm) are frequently taken with the help of simple roller support troughs in which the coil can be rotated. The sample is then obtained by manual flame cutting. However, this method has the disadvantage that it is dangerous for the operator, as, because of their stiffness and elasticity, the ends of the strip can whip around, the coil can roll out of the roller support trough, and the productivity (namely the number of samples per unit time) of such a simple station is low due to the large amount of time involved.

Different qualities of steel, which can be roughly divided into three basic groups, are processed in a modern rolling mill. First, there are the normal, usually hot-coiled structural steels that are plastically deformed when coiled up. In practice, a free final turn of the strip rests on the coil. When, for example, the end of the strip is to be fed into a shear, the end of the strip must be peeled from the coil. Second, there are high-strength fine-grained structural steels that are coiled after having been thermomechanically rolled in the medium temperature range. Because of the high strength of the steel, the plates are only partially plastically deformed. A free final turn of the strip has a larger diameter and stands somewhat away from the coil. Third, the steel qualities used are ultra high-strength steels that are hardened and tempered in the rolling process and have extremely high strength. These materials with maximum strip thicknesses of only approximately 15 mm are only downstream stretched elastically when coiled up. After releasing the coil strapping, a free final turn of the strip assumes its fully extended straight form from the rolling mill once more.

FIG. 1 shows the behavior of the three different steel qualities mentioned above in a typical roller support trough. The coil is supported on two trough rollers 2, 3 and the coil strapping has already been released. While the free end of the normal structural steel, shown at [1], rests close to the outer surface of the coil, the partially plastically wound high-strength steels, shown at [2], spring open at their free end from the region on the right of the right-hand trough roller 3 and accordingly detach from the outer surface of the coil 1. Finally, because of its purely elastic winding in the coil, the ultra high-strength steel, shown at [3], springs back completely into its original shape when the coil strapping is released.

Sampling stations that feed the strip into the separator, for example a shear or plasma burner, are therefore already known in practice. Here, strip of types [1] and [2] undergoes a plastic deformation in which the uncoiled strip end is badly bent and, as a result of this bending moment, the coil can be raised so that a snubber roll may be necessary. In addition, when winding up, it is no longer possible to bend the end of the strip completely against the coil. Such a system according to the prior art is shown in FIG. 2. The free end of the metal strip 4 that has been wound to form a coil 1 is peeled from the outside of the coil 1 by a strip channel 5 and then forcibly fed to a shear 6.

With this method of working, correspondingly large forces, which have to be absorbed by the structure, are produced as a result of the high force. These forces also involve a high level of deformation work and therefore very high drive power in the roller support trough. The coil must also be stabilized by additional other rollers and/or needs large other roll forces in order to be able to transfer the uncoiling torque into the coil. Finally, the strip is pushed/rubbed against force-inducing surfaces and, in combination with the large supporting forces, this damages the strip surfaces.

Further designs are known from practice, for example supporting the coil on a mandrel in combination with different coil opening systems that, however, are all jointly characterized in that the strip is fed into the separating system with a large curvature and therefore under the above-mentioned disadvantages.

Newer developments in this field are shown in FIGS. 3 and 4. After the coil has been transported into the roller support trough comprising rollers 2, 3, the coil strapping is usually removed by a chisel at the end of the swivel table. Immediately after the coil strapping is removed, the strip then springs open as described above to an extent that depends both on the rolling process and on the rolled steel quality. By rotating the coil 1 by turning the trough rollers 2, 3, the strip is pushed into the shear 6 and the end of the strip is cut off for sampling. The leading end 4 of the strip is detached from the outside of the coil 1 by a guide device and fed toward the shear 6. As the required effect must be developed continuously for different coil diameters, the guide device 5 can preferably be pivoted into the intermediate space between the leading strip end 4 and the outer surface of the coil 1 (FIG. 3) or moved in a straight line (FIG. 4).

OBJECT OF THE INVENTION

Starting from the prior art described above, an object of the invention was therefore to provide a method of and apparatus for sampling rolled metal strips wound up into a coil, in particular in the thickness range of >12 mm, by means of which the sampling of thick strips and preferably all steel qualities is automated and can be carried out without the risk of damaging the ends of the strip or danger to the operators.

SUMMARY OF THE INVENTION

According to the invention, samples are taken of rolled metal strips, in particular in the thickness range above 12 mm, in that a length of strip is unwound from the metal strip that, after rolling, has been wound up to form a coil, and is fed to a separator for sampling. The coil is placed on the coil rotator at a free radial spacing that also remains during the unwinding process from an outer guide, preferably an outer cage of the coil rotator that can be extended toward the coil and extends in an unwinding direction from the lower quadrant of the coil to upstream of the separator.

The invention has a coil rotator that comprises a rotatable support, preferably trough rollers that are associated with the lower quadrant of a coil lying on the coil rotator. The lower quadrant of the coil is understood to mean the outer-surface portion of the coil that is aligned from the center of the coil downward in the direction of gravity. The supports of the coil rotator are therefore at an angular spacing of +/−45° to the vertical section plane through the coil, deviations from this 90° angle of a further 15° to either side likewise being seen as associated with the lower quadrant.

A section of strip with a length corresponding to at least 180°, preferably at least 200°, of a portion of the outer surface of the coil is unwound from the top of the coil substantially without force and fed to the separator, and the outer guide, preferably the outer cage, is equipped with means for reducing friction. This enables sampling of the metal strip to be generally automated and to be carried out without the risk of damaging the leading end of the metal strip, the outer guide being used as an upper guide for metal strips of the ultra high-strength type [3] and the bottom guide in the form of at least one movable guide for feeding the leading end into the separator, particularly with metal strips of the normal structural steel type [1] and high-strength type [2].

The invention therefore provides a method of and apparatus by means of which all steel qualities in thickness ranges above 12 mm that are usually wound up to form coils can be taken in for sampling in a safely automated manner.

The unwinding of coils in the elastic expansion range of the strip in order to reduce the forces required and to avoid a projecting turn of the strip is carried out by the arrangement of the rotatable support for the coils within the coil rotator in a lower quadrant of the coil and the separator that is arranged in the quadrant upstream of the upstream support in the unwinding direction, thus providing a long strip end that is guided substantially without force, resulting in only a low curvature of the strip, to enable it to be fed into the separator. Furthermore, to avoid surface damage, the unwound metal strip is conveyed into the separator, for example a shear, along low-friction guide elements.

BRIEF DESCRIPTION OF THE DRAWING

The invention and its background are described below in more detail with reference to a series of figures. In these figures:

FIG. 1 is a side view of a roller support trough according to the prior art,

FIG. 2 is a side view of a further roller support trough according to the prior art, FIG. 3 is a side view of a further roller support trough according to the prior art, FIG. 4 is a side view of a roller support trough according to the prior art, FIG. 5 is a side view of a sampling apparatus according to a first embodiment of the invention, FIG. 6 is a schematic view of a movable guide according to the invention, FIG. 7 is a side view of a further movable guide according to the invention, FIG. 8 is a side view of a second embodiment of a movable guide according to the invention, FIG. 9 is a side view of a further movable guide according to the invention, FIG. 10 is a side view of a third embodiment of a movable guide according to the invention, FIG. 11 is a side view of a further embodiment of a movable guide according to the invention, FIG. 12 is a side view of a further embodiment of the movable guide according to FIG. 10, FIG. 13 is a side view of a further embodiment of the movable guide according to FIG. 11, FIG. 25 is a schematic side view of a separable outer guide according to the invention in a further embodiment, FIG. 26 is a schematic side view of a separable outer guide according to the invention in a further embodiment, FIG. 27 is a schematic side view of a separable outer guide according to the invention in a further embodiment, FIG. 28 is a schematic side view of a ninth embodiment of the sampling apparatus according to the invention, FIG. 29 is a schematic side view of a tenth embodiment of the sampling apparatus according to the invention.

SPECIFIC DESCRIPTION OF THE INVENTION

Figure 14:
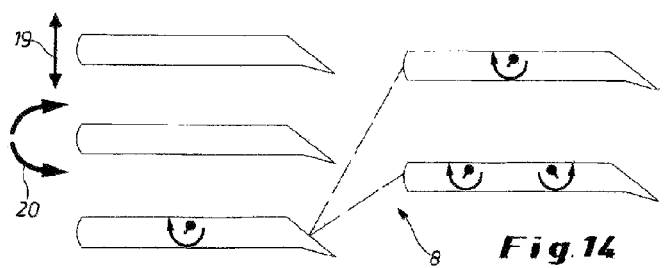
FIG. 14 is a schematic diagram of the possible vibration of the movable guide according to FIGS. 12 and 13.

FIG. 5 shows a coil 1 that has been placed on two trough rollers 2, 3 and that is unwound angularly as shown by the arrow 24 and transported to the shear 6. The leading end of the strip 4 runs in a space 13 between the outer surface of the coil 1 and an inner surface of the outer cage 5 and is specifically fed in between blocks of the shear 6 by a movable guide 8 and a pivotally mounted drive roller 14. In this embodiment, the movable guide 8 has a row of five rollers 9a-e, of which the roller 9a, which is arranged closest to the separator, here a shear 6, is fixed in position and is rotatably mounted, while the other rollers 9b-9e are pivotal about its axis 15 inside the apparatus.

FIG. 6 shows the pivoting of the movable guide 8 from FIG. 5 with the rollers 9a-9e that are rotatably mounted about the pivot axis 15 and are arranged in a row on a roller table and can be pivoted out of the starting position (shown in dashed lines) into the operating position through the pivot angle α. The roller table also has a peeler element 16 for if necessary loosening a strip end resting on the coil and feeding it into the separator 6. This guarantees low-friction movement of the unwound strip along the guide elements 5, 9a-e into the separator 6, in particular the shear. The roller conveyor shown here also allows the strip end to be actively conveyed into the shear 6, as a result of which there is no static friction between the guide element 9 and the metal strip 4. Preferably, the speeds of the rollers 9a-e within the roller guide and of the strip 4 should be matched in order to reduce wear.

FIG. 7 shows a further embodiment of a movable guide 8 according to the invention, where the five rollers 9a-9e are arranged on a disk roller table in a similar way to the embodiment according to FIG. 6. Unlike in the embodiment according to FIG. 6, this disk roller table is not pivotally mounted but is provided so that it can be moved along the arrow 17 from its starting position (shown dashed) into its operating position resting on the coil (not shown).

FIG. 8 shows a second embodiment of a movable guide according to the invention, with which, unlike in the embodiment according to FIGS. 6 and 7, chains 10 are used instead of disk rollers for guiding the metal strip 4 into the separator (not shown) and for reducing friction as well as for driving the metal strip. All link chains and sprocket chains can be used here, for example roller chains, toothed chains, hinged chains and plate chains as well as scraper chains. This also enables the strip end to be actively conveyed into the separator, in particular the shear, as a result of which static friction between the movable guide 8 and the strip (not shown) is no longer present or is at least minimized.

In a similar way to the embodiment according to FIG. 7, FIG. 9 shows straight-line guiding of the movable guide 8 with chain drive 10 out of the starting position (shown dashed) along the arrow 17 into the operating position in which the peeler element 16 is guided to rest on the coil (not shown). In this case too, the speeds between the chain guide and the strip that is unwound from the coil should be matched in order to avoid unnecessary wear.

FIG. 10 shows a third embodiment of a movable guide 8 according to the invention, wherein, in this embodiment, a pivot table can be pivoted about the pivot axis 15 from its starting position (shown dashed) through a pivot angle α into its operating position. The table has a coating or a sliding element (for example plates or rails) in order to provide a guide that has as little friction as possible or is free from friction with good sliding properties for the metal strip into the separator (not shown). Particularly preferred is a coating using ceramics, spray coatings or sinter materials in order to achieve the required low-friction properties.

As in the embodiments according to FIGS. 6 to 9, FIG. 11 shows a movable guide 8 that, unlike in the embodiment according to FIG. 10, is not pivotable but can be movably guided along the arrow 17 from the starting position (shown dashed) into the operating position. In both cases, friction between the movable guide 8 and the strip (not shown) is greatly reduced as a result of the reduction in friction due to the good sliding properties.

FIG. 12 shows a further possible use of the embodiment according to FIG. 10 where the movable guide 8 is vibrated as shown at 18 at least in its operating position in order to reduce friction, in particular static friction, between the movable guide 8 and the strip (not shown).

As in the embodiments according to FIGS. 6 to 11, FIG. 13 shows straight-line guiding of the movable guide 8 along the arrow 17, the traverse table shown here likewise being able to vibrate in order to reduce static friction.

FIG. 14 shows different possibilities of vibration types/ excitations, that can be applied to the movable guide 8 in the form of a pivot table or traverse table. On the one hand, purely translatory movements parallel to arrow 19 or rotational movements as shown by arrow 20 can be applied to the movable guide 8. In a further and preferred embodiment of the invention, however, movement of the movable guide 8 is brought about by an imbalance that can be present on one axle or on multiple axles. In all cases, however, static friction is significantly reduced by vibrating the movable guide 8. It goes without saying that the embodiments according to FIGS. 6 to 14 can also be combined with one another in suitable ways in order to achieve or amplify the desired effects.

Figure 15:
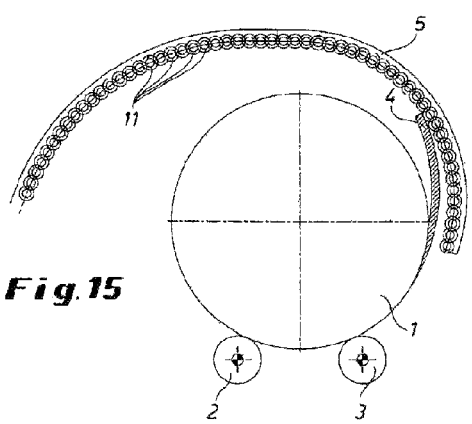
FIG. 15 is a side view of a second embodiment of the sampling apparatus according to the invention.

FIG. 15 shows a second embodiment of an apparatus according to the invention for sampling rolled metal strip that has been wound up to form a coil 1, the coil 1 being supported on the trough rollers 2, 3 in the usual way. The leading end 4 of the metal strip is made of ultra high-strength steel and therefore springs back elastically from the outer surface of the coil 1 against the outer guide 5. In order to reduce friction between the end 4 and the outer guide 5, there is an array of rollers 11 along which the leading end 4 of the metal strip can be guided almost free from friction along the whole outer guide 5 to the separator (not shown) on the inner surface of the outer guide 5. This not only ensures feeding to the shear (not shown), but also prevents the metal strip from springing up too much. This ensures that the strip end is actively conveyed into the shear, while at the same time static friction between the outer guide 5 as guide element and the strip is no longer present. For this purpose, the outer guide 5 is provided with disk rollers 11, where, in the case of an active drive, the speeds should preferably be matched between the guiding by the rollers 11 and the guiding of the strip by the drive of the trough rollers 2, 3.

Figure 16:
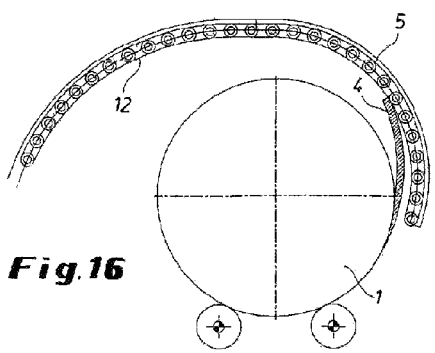
FIG. 16 is a schematic side view of a third embodiment of a sampling apparatus according to the invention.

FIG. 16 shows a schematic side view of a third embodiment of an apparatus according to the invention for sampling rolled metal strips wound up into a coil 1, the structure being similar to the second embodiment according to FIG. 15. Unlike in the embodiment according to FIG. 15, however, no disk rollers are attached to the inner surface of the outer guide 5; instead use is made of a chain drive, for example in the form of plate or hinged chains that can transport the leading end 4 of the metal strip without friction along the outer guide 5 for sampling. In the case of driven chains, the strip end 4 is actively conveyed into the shear (not shown), static friction between the outer guide 5 and the metal strip no longer being present. In this case too, when the chain links are driven, speeds should be synchronized between the chains 12 and the metal strip in order to reduce wear.

Figure 17:
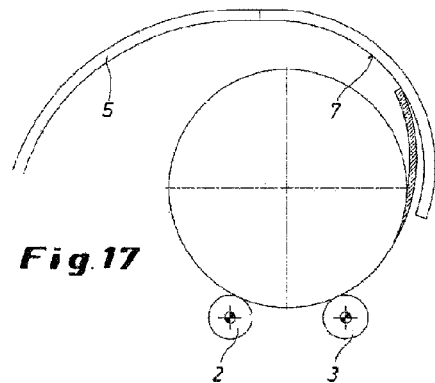
FIG. 17 is a schematic side view of a fourth embodiment of a sampling apparatus according to the invention.

FIG. 17 shows a schematic side view of a fourth embodiment of the sampling apparatus according to the invention, the principle structure of which with the trough rollers 2, 3 and the outer guide 5 corresponds to the second and third embodiments according to FIGS. 15 and 16. However, no disk rollers or chains are arranged on the inner surface of the outer guide 5; rather, the means for reducing friction 7 consists of a coating or sliding elements, for example in the form of plates or rails. This ensures good sliding properties that can be achieved using ceramics, spray coatings or sinter materials in a manner that is easily accessible to the person skilled in the art. In this case too, the reduction in friction is effected by good sliding properties so that friction between the outer guide 5 and the strip is greatly reduced.

Figure 18:
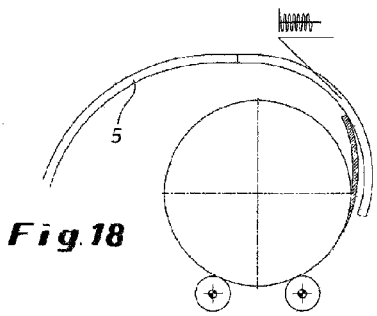
FIG. 18 is a schematic side view of a modification of the fourth embodiment according to FIG. 17.

FIG. 18 shows a further modification of the fourth embodiment of the invention as shown in FIG. 17. In order to further reduce friction between the metal strip and the outer guide 5, the latter can be vibrated so that static friction between the outer guide 5 and the strip is reduced to sliding friction.

Figure 19:
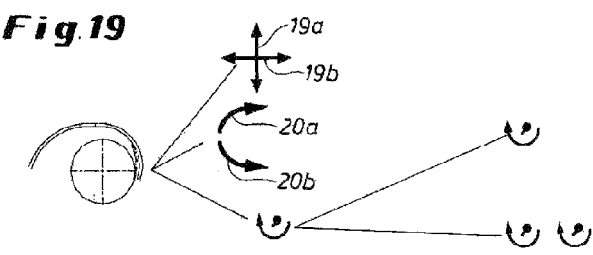
FIG. 19 is a schematic diagram of the vibration modes of the apparatus according to the invention according to FIG. 18.

FIG. 19 shows the movements that are possible here, namely, on the one hand, translatory vibrations in the direction of the arrows 19a, 19b or rotational oscillations in the direction of the arrows 20a, 20b. Finally, vibrations due to imbalance can also have the desired effect, these imbalance vibrations being developed on one axle or on multiple axles. In each case, however, the reduction in friction is achieved by movement of the outer guide 5.

Figure 20:
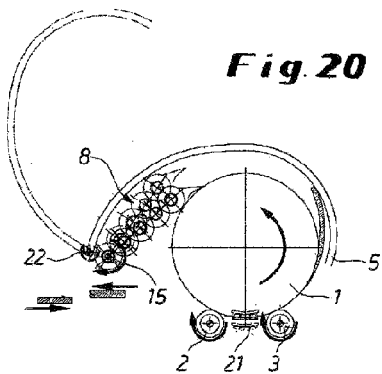
FIG. 20 is a schematic side view of a fifth embodiment of the sampling apparatus according to the invention.

FIG. 20 shows a schematic side view of a fifth embodiment of the sampling apparatus according to the invention. Even when using a crane, easy access to the roller support trough is particularly desirable for easier operation, especially when introducing and removing the coil from the roller support trough formed by the trough rollers 2, 3 and the coil transport car 21. For this purpose, not only is the movable guide 8 pivotally mounted about the pivot axis 15, but also the outer guide 5 can be pivoted out of the operating position into a coil retrieval position (shown dashed). When the outer guide 5 is pivoted about the pivot axis 22, unrestricted access to the coil 1, for example for a crane, is possible from above. At the same time, the apparatus according to the invention can easily be put back into operation with particularly simple means after placing a new coil 1 in the roller support trough.

Figure 21:
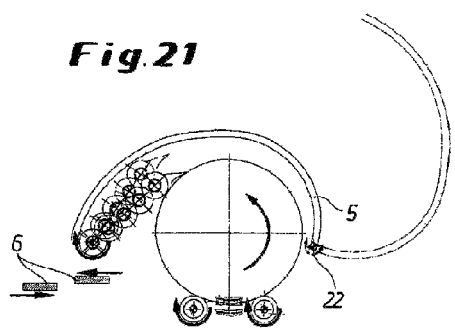
FIG. 21 is a schematic side view of a sixth embodiment of the sampling apparatus according to the invention.

FIG. 21 shows a sixth embodiment of the sampling apparatus according to the invention, where, as in the embodiment according to FIG. 20, the outer guide 5 can be pivoted out of the operating position into a coil retrieval position (not shown). Unlike in the fifth embodiment according to FIG. 20, the pivot axis 22 for the outer guide 5 is at the entry side of the outer guide 5 for the metal strip (not shown). In this case too, however, a coil 1 can be easily transferred from above, even when using a crane, by pivoting the outer guide 5.

Figure 22:
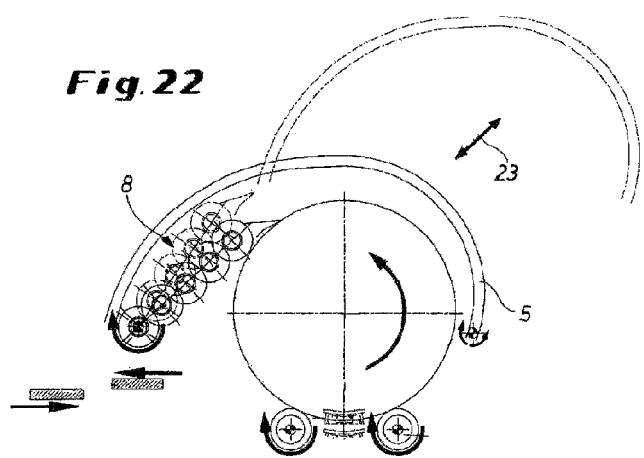
FIG. 22 is a schematic side view of a seventh embodiment of the sampling apparatus according to the invention.

FIG. 22 shows a seventh embodiment of the sampling apparatus according to the invention, wherein, in this embodiment, the outer guide 5 can be moved in a translatory manner along the arrow 23 out of the operating position into the outer position (shown dashed).

Figure 23:
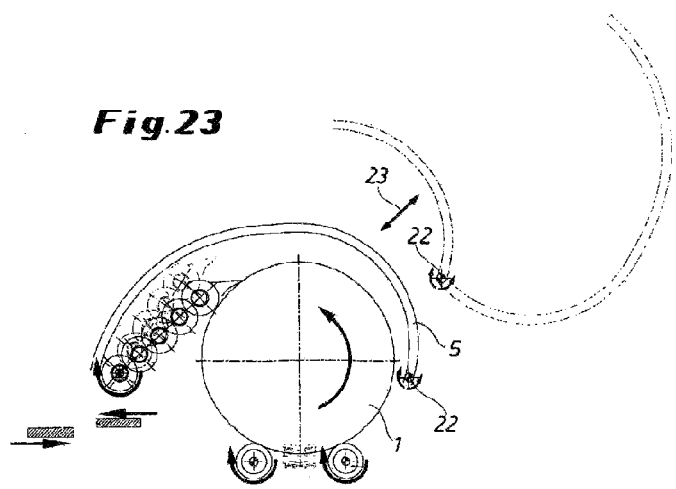
FIG. 23 is a schematic side view of an eighth embodiment of the sampling apparatus according to the invention.

FIG. 23 shows an eighth embodiment of the sampling apparatus according to the invention that is characterized in that the outer guide 5 can be moved both in a translatory manner parallel to the arrow 23 and pivoted about the axis 22 out of the operating position into the outer position (shown dashed) to allow safe access to the coil 1 supported in the roller support trough even when using a crane. It goes without saying that the use of the traverse drives and pivot joints can be selected depending on the required situation.

Figure 24:
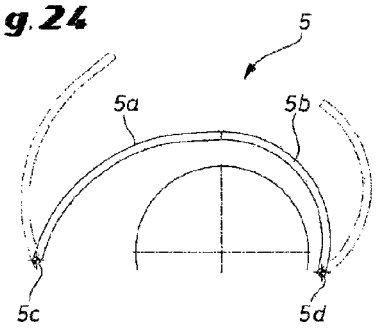
FIG. 24 is a schematic diagram of a separable outer guide according to the invention.

FIG. 24 shows a further embodiment of an outer guide 5 that, in the form shown here, consists of two outer guide elements 5a, 5b that can be moved independently of one another. The outer guide elements 5a, 5b are each pivotally mounted at respective pivot axes 5c, 5d and can therefore either be pivoted out of their operating position individually or coupled to one another.

FIG. 25 shows a further embodiment where the outer guide 5 is pivoted out of the operating position into an outer position (shown dashed) by pivoting the outer guide elements 5a, 5b about their respective pivot axes 5c, 5d. Overall, separating the outer guide 5 ensures easy access to the coil 1 inside the apparatus according to the invention.

FIG. 26 shows a further embodiment of an outer guide 5 as part of a sampling apparatus according to the invention, in which, in a similar manner to the embodiment according to FIG. 25, the outer guide elements 5a, 5b are coupled to one another and can be pivoted away around the coil 1 out of the operating position around pivot axes 5c, 5d. At the same time, the outer guide element 5b is pivotally connected to the outer guide element 5a in a dependent and coupled manner.

FIG. 27 shows a further embodiment of an outer guide 5 as part of a sampling apparatus according to the invention, where, in this embodiment, the outer guide 5 likewise consists of separable outer guide elements 5a, 5b. For better access to the coil 1, a combined movement of both outer guide elements 5a, 5b takes place by pivoting the outer guide 5 as a whole about the pivot axis 5c and sliding the outer guide element 5b along the curved outer surface of the outer guide element 5a.

FIG. 28 shows a schematic side view of a ninth embodiment of the sampling apparatus according to the invention that, in particular, simplifies the insertion of the leading end 4 of the metal strip into the shear 6. The metal strip with a thickness considerably greater than 12 mm is unwound from the coil 1 along the outer guide 5 that, in the embodiment shown, has a sliding inner coating 7, and fed thereby toward the separator 6. In order to ensure that the leading end 4 of the metal strip enters the shear 6 safely, a drive roller 14 is moved through a pivot angle α onto the metal strip so that it is not only guided between the drive roller 14 and the roller 9a of the movable guide 8 but is also driven thereby. It goes without saying that the elements shown here according to the ninth embodiment can be combined in a suitable manner with individual components of the other embodiments in order to achieve or amplify the possible effects.

Finally, FIG. 29 shows schematically a side view of a tenth embodiment of the sampling apparatus according to the invention, in which at least the right-hand trough roller 3 is mounted so that it can be pivoted out of the original position about an angle β. As a result of the forces acting on the coil 1 when a sample is taken, namely the force F required to extend the beginning of the strip, which is substantially applied to the coil 1 by the movable guide 8, the reaction force R to F, the coil weight G, the force of the new snubber roll in the coil opener K and the acting lever arm of the coil opening force e1, the lever arm of the coil weight without pivotable coil support e2, the additional lever arm as a result of pivoting the coil support e3, the new lever arm e4 and the lever arm of the snubber roll of the coil opener e5, the reaction force R from the coil on the left-hand trough roller 2 in conjunction with the lever e1 results in a torque that pushes the coil out of the roller support trough to the left in the figure. Thanks to the pivotable arrangement of the trough roller 3, the stabilizing moment is increased by an additional lever arm e3. As a result of this advantageous design, coils 1 with a significantly smaller diameter can likewise be automatically sampled in the sampling apparatus according to the invention.

The invention claimed is:

1. A system for separating a sample from a leading end of a coil of metal strip thicker than 12 mm, the system comprising:
   a rotator having upstream and downstream supports spaced to generally engage a lower quadrant of the coil and rotatable to turn the coil about its center from the upstream to the downstream support and thereby unwind the leading end of the coil in an unwinding direction off the coil;
   an outer guide surrounding the coil above the supports by more than 180° about the coil center from the upstream support and having an inner surface directly juxtaposed with the leading end as the leading end unwinds from the coil;

means on the inner surface directly engageable with the leading end of the strip for vibrating the inner surface of the outer guide and thereby reducing friction between the strip and the outer guide; and a separator upstream of the upstream support and downstream of the guide for cutting the leading end off the strip unwinding from the coil.

2. The system defined in claim 1, further comprising:

at least one movable guide for feeding the leading end of the metal strip into the separator upstream of the separator in the unwinding direction of the metal strip.

3. The system defined in claim 2, wherein the movable guide has at least one roller that can be pivoted against the metal strip.

4. The system defined in claim 2, wherein the movable guide has at least one chain that can be pivoted against the metal strip.

5. The system defined in claim 1, wherein the outer guide is an outer cage or cover.

6. The system defined claim 1, wherein the outer guide is centrally above a portion of an outer surface of the coil extending upstream from the downstream support in the unwinding direction of the metal strip to the separator so as to substantially completely cover the coil on the coil rotator.

7. The system defined claim 1, wherein the means for reducing friction includes at least one roller or chain.

8. The system defined in claim 7, further comprising:

means connected to the roller or chain for rotating the roller or chain at a speed synchronous with that of the unwinding end.

9. The system defined in claim 1, wherein, at least in subregions, the outer guide is engageable directly against the coil on the rotator.

10. The system defined in claim 1, wherein at least one of the rotatable supports is pivotable.

11. The system defined in claim 1, wherein the separator is upstream of the upstream support in the unwinding direction of the coil within an outer-surface portion of the coil of not greater than 90°.

12. A method of separating a sample from a leading end of a coil of metal strip thicker than 12 mm, the method comprising the steps of:

supporting the coil on a rotator having upstream and downstream supports spaced to engage a lower quadrant of the coil and rotating at least one of the supports to turn the coil about its center from the upstream to the downstream support and thereby unwind the leading end of the coil in an unwinding direction off the coil;

surrounding the coil above the supports by more than 180° about the coil center from the upstream support with an outer guide having an inner surface directly juxtaposed with the leading end as the leading end unwinds from the coil;

providing means on the inner surface directly engageable with the leading end of the strip for vibrating the inner surface of the outer guide and thereby reducing friction between the strip and the outer guide; and cutting the leading end off the strip upstream of the upstream support and downstream of the guide.

13. The method defined in claim 12, wherein the strip is made of structural steels, high-strength steels, and ultra high-strength steels.

14. The method defined in claim 13, wherein a radial spacing between the coil and the outer guide can be adjusted so that the leading end of the unwound metal strip only makes contact with the outer guide when sampling metal strip made of ultra high-strength steels.

* * * * *